March 31, 1964  A. P. VOSTI ETAL  3,126,930
ONION CORING, TOPPING, SCALING AND HALVING MACHINE
Filed Oct. 6, 1959  7 Sheets-Sheet 1

INVENTORS
ALBERT P. VOSTI
HERBERT M. EDDE
JOSE JUAN SAAVEDRA
BY
ATTORNEY

INVENTORS
ALBERT P. VOSTI
HERBERT M. EDDE
JOSE JUAN SAAVEDRA
BY
ATTORNEY

March 31, 1964 A. P. VOSTI ETAL 3,126,930
ONION CORING, TOPPING, SCALING AND HALVING MACHINE
Filed Oct. 6, 1959 7 Sheets-Sheet 4

INVENTORS
ALBERT P. VOSTI
HERBERT N. EDDE
JOSE JUAN SAAVEDRA
BY
ATTORNEY

March 31, 1964 A. P. VOSTI ETAL 3,126,930
ONION CORING, TOPPING, SCALING AND HALVING MACHINE
Filed Oct. 6, 1959 7 Sheets-Sheet 5

INVENTORS
ALBERT P. VOSTI
HERBERT M. EDDE
JOSE JUAN SAAVEDRA
BY
ATTORNEY

March 31, 1964  A. P. VOSTI ETAL  3,126,930
ONION CORING, TOPPING, SCALING AND HALVING MACHINE
Filed Oct. 6, 1959  7 Sheets-Sheet 6

INVENTORS
ALBERT P. VOSTI
HERBERT M. EDDE
JOSE JUAN SAAVEDRA
BY

ATTORNEY

March 31, 1964  A. P. VOSTI ETAL  3,126,930
ONION CORING, TOPPING, SCALING AND HALVING MACHINE
Filed Oct. 6, 1959  7 Sheets-Sheet 7

INVENTORS
ALBERT P. VOSTI
HERBERT M. EDDE
JOSE JUAN SAAVEDRA
BY

ATTORNEY

United States Patent Office 3,126,930
Patented Mar. 31, 1964

3,126,930
ONION CORING, TOPPING, SCALING AND HALVING MACHINE
Albert P. Vosti, Herbert M. Edde, and Jose Juan Saavedra, Gilroy, Calif., assignors to Gentry Division, Consolidated Foods Corporation, a corporation of Maryland
Filed Oct. 6, 1959, Ser. No. 844,792
4 Claims. (Cl. 146—83)

This invention relates to a machine for preparing and orienting onions for cutting into thin silces for subsequent dehydration.

The cleaning and preparation of field dried onions in preparation for subsequent slicing and dehydration of the slices usually involves a first step of passing the onions through a flame to burn off the dried skins and the smaller roots. The flame treated onions have then been further prepared for slicing, subsequent to drying or dehydration, almost entirely by hand, or by the use of manually applied rotary tools, each onion being individually handled. It can be readily understood that, because of the odor and the lachrymatory effects of onion juice, these hand operations involve many personnel difficulties. The cost of hand operation is high, and is made higher by the above difficulties.

It is therefore a principal object of this invention to provide a machine which, when the flame-treated onions are fed to it, automatically prepares and orients onions for thin slicing on planes perpendicular to the natural axis of the onion. Another object of this invention is to provide a machine which removes the root core from dried onions while they are mounted upon impaling points on a moving conveyor. Another object is to provide a machine which successively removes the root core from dried onions, cuts off the top of the onion, removes any loose dry outer scales or skins, and cuts the onions in halves in a plane perpendicular to the natural axis of the onion, as the onions move through the machine on a conveyor.

These and other objects are attained by our invention which will be understood from the following description, reference being made to the accompanying drawings in which.

Figure 1:
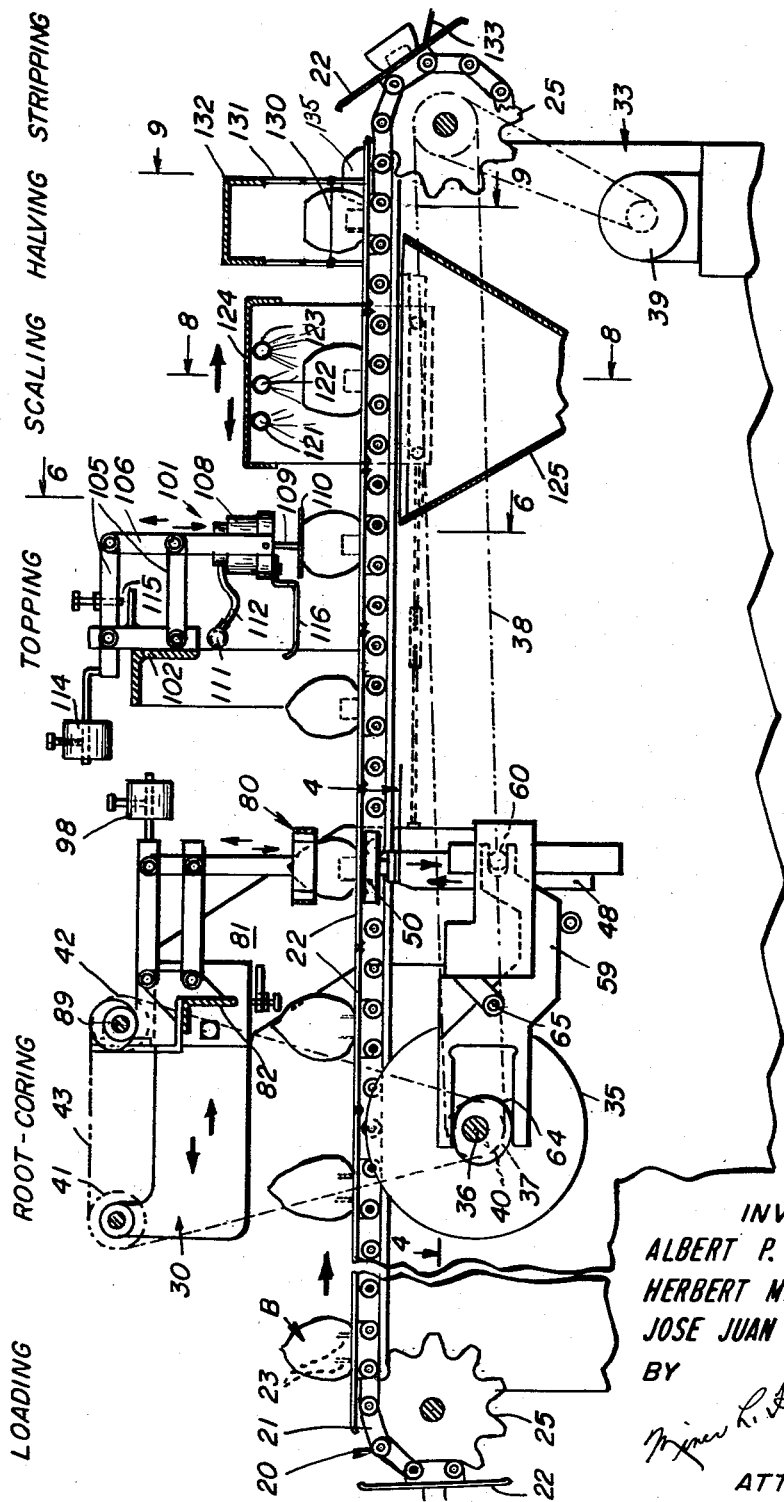
FIG. 1 is a side elevational view with certain parts in section showing the principal functional parts of the machine.
Figure 2:
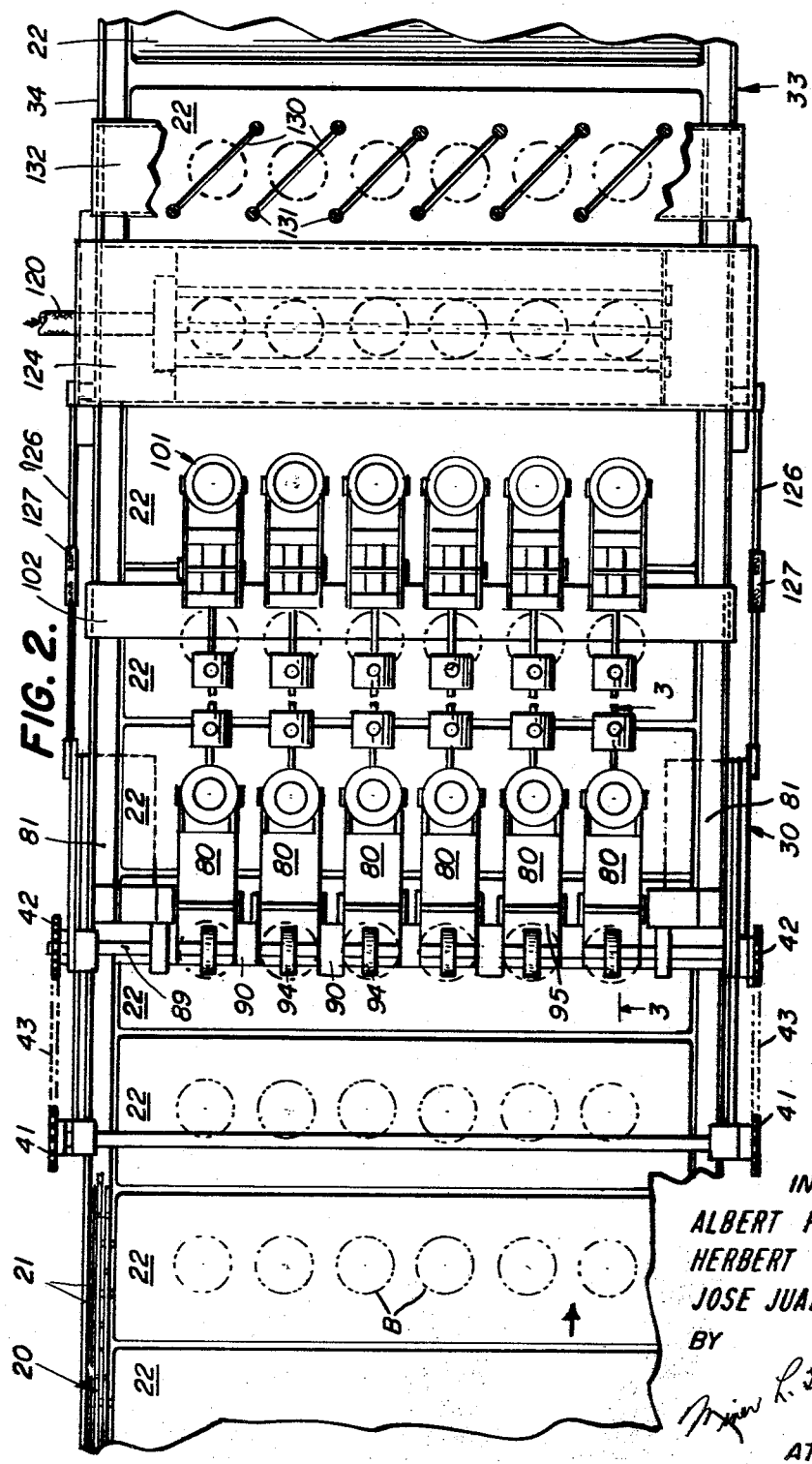
FIG. 2 is a plan view of a preferred form of our machine, following FIG. 1.
Figure 3:
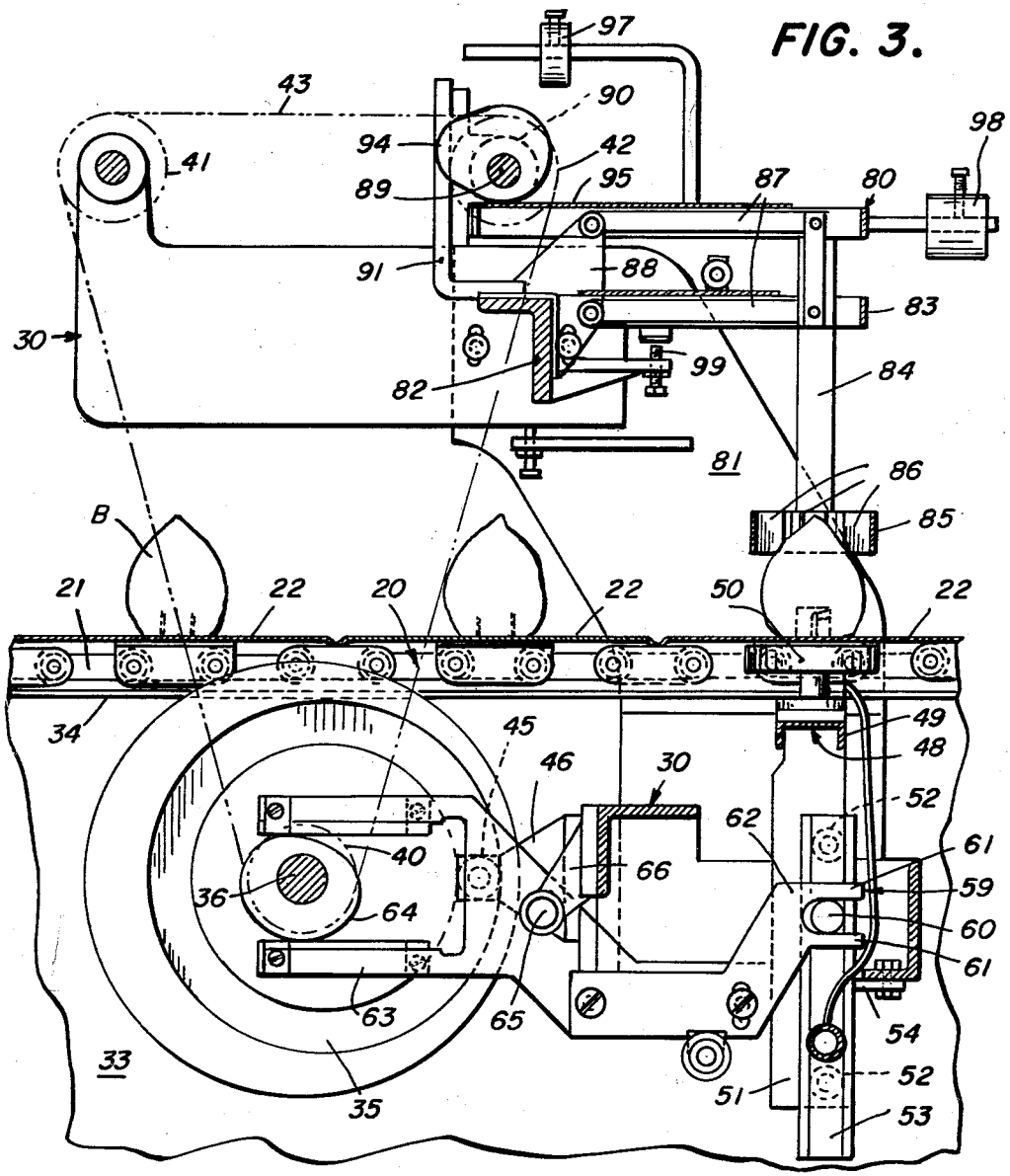
FIG. 3 is an enlarged sectional view taken on the line 3—3 of FIG. 2 showing the root coring station.
Figure 4:
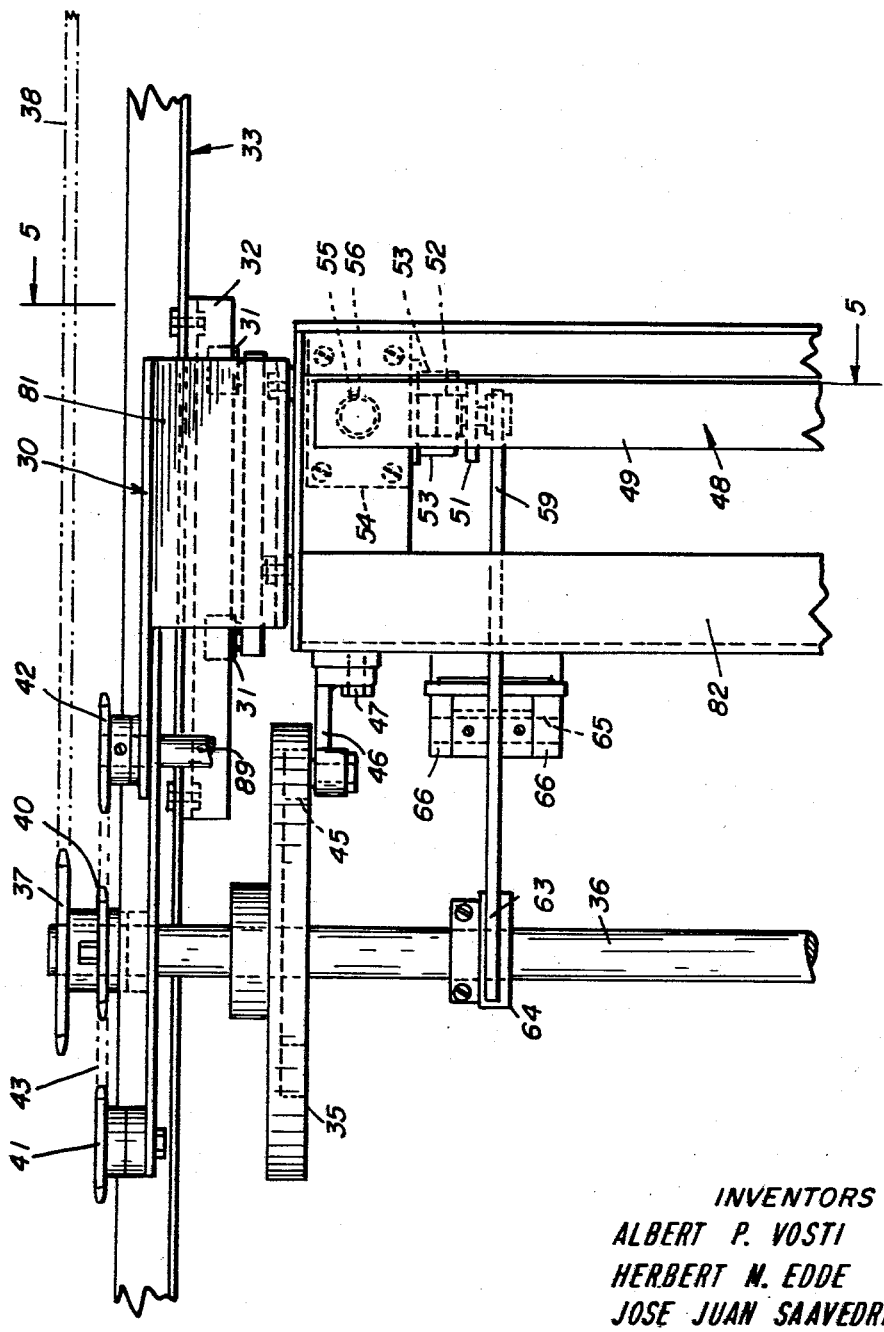
FIG. 4 is an enlarged plan view taken on the line 4—4 of FIG. 1, the root coring means being omitted for clarity.
Figure 5:
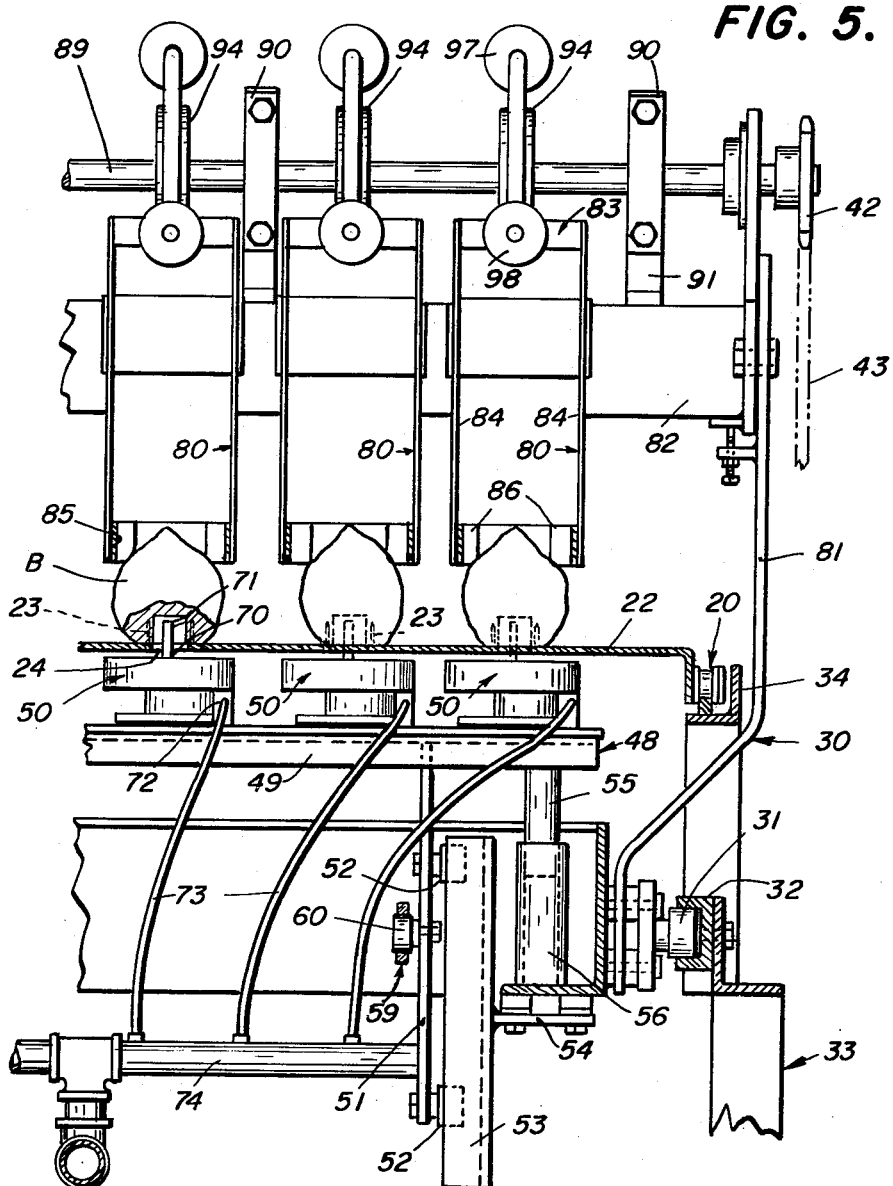
FIG. 5 is a vertical sectional view taken on the line 5—5 of FIG. 4.
Figure 6:
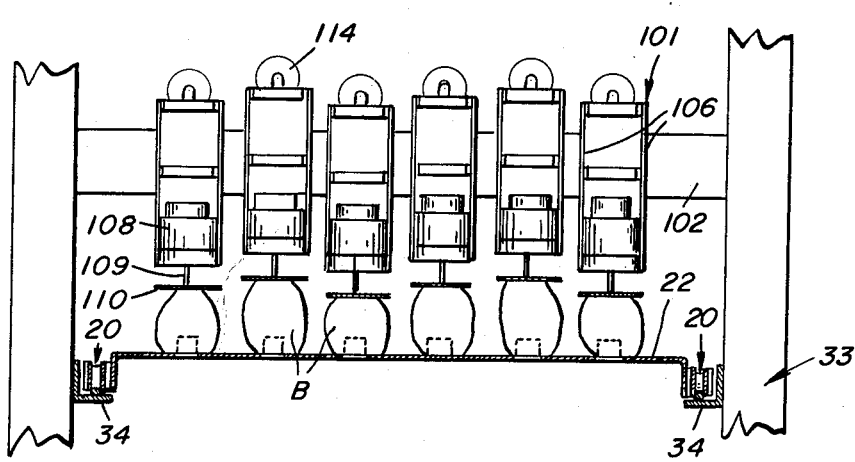
FIG. 6 is a vertical sectional view taken on the line 6—6 of FIG. 1.
Figure 7:
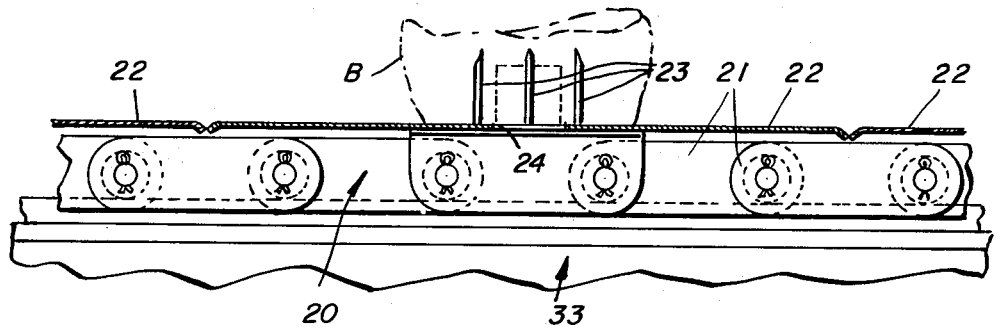
FIG. 7 is an enlarged fragmentary side elevational view of the conveyor chain flights showing the impaling pins.
Figure 8:
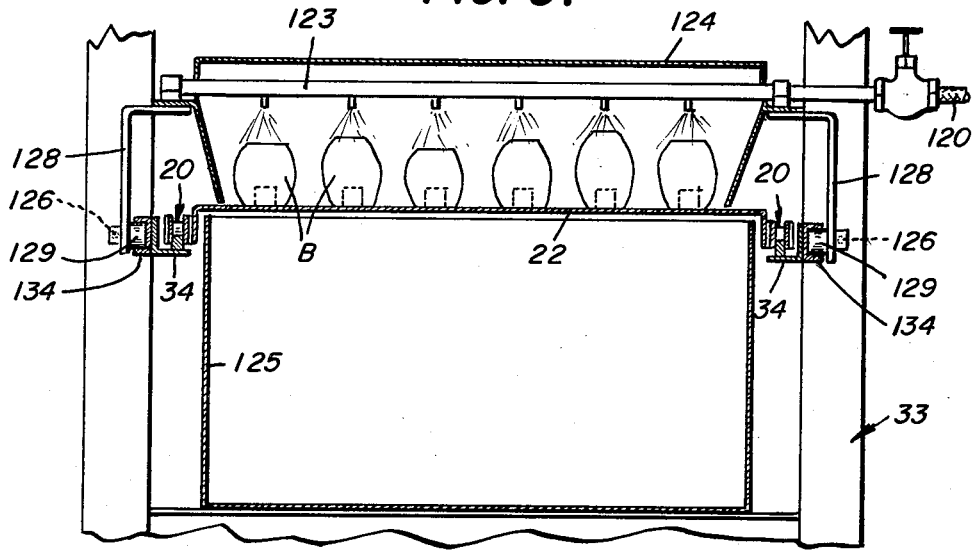
FIG. 8 is a vertical sectional view taken on the line 8—8 of FIG. 1.
Figure 9:
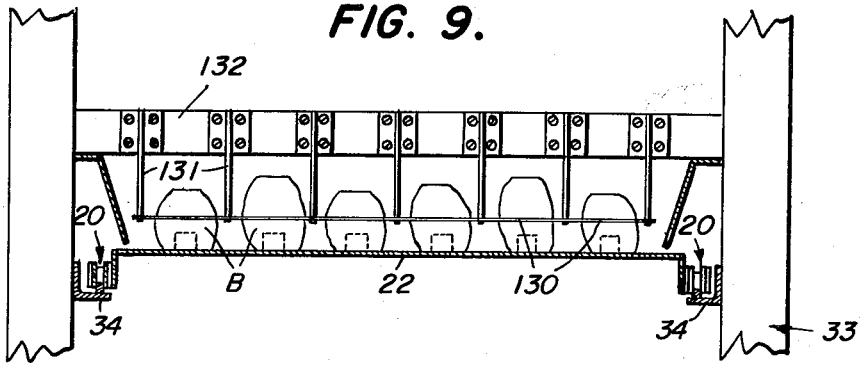
FIG. 9 is a vertical sectional view taken on the line 9—9 of FIG. 1.

Referring particularly to FIG. 1, our invention includes a horizontal conveyor made up of a pair of spaced apart conveyor chains 20 having elongated links 21 upon which are attached flights 22 extending from one side of the conveyor to the other. The flights are provided with impaling pins 23 spaced around openings 24, usually in groups of four pins 23, these groups being spaced across the conveyor so that a plurality of rows of onions (eight being shown in the drawing) may be mounted on the groups of pins 23, to be carried through the subsequent treating stations, as will be described. The conveyor chains are mounted in the usual way on chain sprockets 25 which are operatively mounted on the machine main frame 33, being driven by a motor drive 39. The onions B mounted on the impaling pins are processed at successive treating stations which will here be designated generally as the root coring station, the topping station, the scaling station, the halving station, and the stripping station.

Referring particularly to the root coring station, a hold-down means is provided which presses down on the top of the impaled onion, while simultaneously a coring device is raised through the openings 24 in the flights underneath the impaled onions, the mechanisms for both of these operations being mounted on a movable frame 30 which during these operations moves along with the conveyor. After the root coring has been effected, the movable frame 30 supporting the hold-down mechanism and the coring mechanism is returned in a direction opposite to that of the moving chain so that the next onion in each longitudinal row of impaled onions on the conveyor is engaged by its corresponding hold-down mechanism while simultaneously the coring devices are again brought into operation on the onion root core through the openings 24.

The hold-down means and the coring means are mounted on the movable horizontal frame 30 which extends across the width of the conveyor and is adapted to be reciprocated horizontally on the rollers 31 which ride on horizontal tracks 32 which are mounted on the main frame 33 of the machine. The movable frame 30 is reciprocated horizontally by the action of the horizontal movement cam 35 which is attached to the drive shaft 36 which is mounted across the machine on the main frame 33, this shaft being driven through the timing drive sprocket 37 and chain 38 operatively connected to the conveyor drive. One end of the drive shaft is provided with a timer sprocket 40 which actuates by a timing chain 43 passing over an idler sprocket 41 and also over the timing gear 42 for the holddown cam shaft, as will be described. A cam follower 45 is operatively attached to a bracket 46 affixed by the bolt 47 to the horizontal frame 30 so that upon rotation of the drive shaft 36, the frame 30 is reciprocated, the movement in the direction of the conveyor being synchronized with the conveyor movement.

Mounted on the reciprocable frame 30 is a vertically movable frame 48 consisting of a cross-member 49 supporting the coring units 50, and vertical arms 51 at opposite ends of the cross-member. The vertical arms 51 are provided with rollers 52 which are engaged between vertical tracks 53 mounted on brackets 54 which are attached to or integral with the horizontal movable frame 30. Telescoping guide cylinders 55 and 56 are attached respectively to the underside of the cross-member 49 and to the brackets 54.

The vertical frame 48 is raised and lowered by means of the pivoted fork member 59 which is operatively connected to the vertical arms 51 by means of a roller pivot 60 which is engaged between the two prongs 61 at one bifurcated end 62 of the member. The other bifurcated end 63 of the fork member engages the vertical movement cam 64, which is mounted on and for rotation with the timing drive shaft 36. The fork member 59 is pivoted at an intermediate position on the pivot 65 mounted in bearings 66 attached to the reciprocable horizontal frame 30.

The root coring units 50 are mounted on the member 49 in spaced apart positions corresponding to the several rows of groups of impaling pins 23 upon which the individual onions B are placed, root end down. The units 50 consist generally of a water driven turbine 70 which rotates an upstanding knife 71, there being provided a suitable nozzle 72 which communicates through the flexible hose 73 with the header pipe 74 connected to a source of water under pressure.

The movable frame 30 below the conveyor flights 22 also supports, by the side members 81, the hold-down units 80, above the flights. Each hold-down unit adjusts individually to the impaled onion B which is to be cored. The hold-down units 80 are mounted on a cross frame member 82 attached to the side members 81. The hold-down frame 83 consists of a pair of depending legs 84 the lower ends of which hold the cylindrical cup 85 within which are four steel fins 86 adapted to engage the stem end of the onion B and hold it securely while the coring knife 71 is removing the root core. The upper ends of the legs 84 are pivotally attached to the parallel motion lever means 87 which are operatively pivoted to the bracket 88 attached to the cross frame member 82. A hold-down cam shaft 89 is mounted in bearings 90 supported on bearing brackets 91 affixed to the cross frame member 82. Cams 94 are mounted on the shaft 89, the cam for each hold-down unit pressing upon the cam plate 95 of the parallel motion lever means 87, thereby raising and lowering each corresponding hold-down frame 83 and its hold-down cup 85 on the corresponding onion impaled on the conveyor flights.

Adjustable counter-balancing weights 97 and 98 are provided respectively on each of the cam plates 95 and each of the hold-down frames 83. An adjustable stop 99 is also provided on the parallel lever means 87 to prevent contact of the hold-down cup with the impaling pins 23 in the event that an onion was not on the pins.

A timing gear 42 is mounted on the outer end of the shaft 89 and through the chain 38 synchronizes the operation of the cams 94 with the movements of the conveyor and the movable horizontal frame 30, and the vertically movable frame 48 on which the root coring units 50 are mounted.

After the root coring operation, the onions on the pins 23 are carried forward by the conveyor to the onion topping station where the dried tip is removed by slicing off the top of the onion B. Since the onions vary in height, the topping mechanism is automatically adjusted to sever the minimum amount of the onion which will remove the dried tip.

The individual topping units 101 are disposed over each longitudinal row of onions B on the impaling pins 23 on the conveyor. The topping units 101 are mounted on a topping cross beam 102 which is supported on the horizontal members 34 of the main frame 33. Each unit consists of a double parallel motion lever means 105, the twin forward vertical connecting links 106 being extended downwardly to support between them a pneumatic motor 108 on whose vertically disposed shaft 109 there is mounted a horizontally disposed saw blade 110. A header pipe 111 for compressed air extends across the main frame 33, and flexible hoses 112 connect therefrom to each motor 108. An adjustable counterweight 114 extends rearwardly from the parallel motion lever means 105 and a stop means 115 is provided to limit the downward movement of the lever means, motor and saw blade. The actual working elevation of the topping saw blade 110 is regulated by the feeler 116 which engages and slides over the top shoulder portion (not the tip) of the next onion on the conveyor to be topped, thus setting the elevation of the saw blade.

After the tip of the onion has been removed at the topping station, it is desirable to remove any dried or partly dried outer scales or skins of the onion, and this is accomplished by passing the topped onion B through the scaling station. The operation consists of directing a plurality of fine water jets on the cut-off tops of the onions. Any dried scales are thus loosened and removed by the force of the streams of water. A flexible water supply line 120 feeds three transverse parallel water pipes 121, 122 and 123, each being provided with nozzles directed over the impaling positions on the conveyor flights. The pipes are supported by a shield member 124 which is reciprocably supported over the conveyor on the horizontal main frame members 34. The spray pipes and shield member 124 are operatively connected to the reciprocating frame 30, there being turn buckles 127 in the connecting rods or links 126 to adjust the movement of the sprays on to the impaled and decapitated onions, the shield member 124 being supported by the brackets 128 whose end roller 129 rides on the roller track 134 mounted on the main frame 33. Collecting and draining means 125 are provided beneath the conveyor.

The onions are now ready for slicing, but in order to produce the desired slices cut perpendicular to the natural axis of the onion, the onions are cut off at approximately half height while on the impaling pins 23. The cut faces of the half onions may then serve as an orientation base, so that the halves (or near halves) may be fed through spaced horizontal cutters to form slices perpendicular to the onion axis.

The halving station consists, for each longitudinal row of onions moving with the conveyor, of thin narrow edged blades 130 disposed at an angle to the line of travel of the onion, the ends being secured to mounting bars 131 depending from channel structural member 132 which extends over the conveyor, this channel being mounted on the main frame 33. It will be understood that the "halving" knives need not be automatically adjustable as to elevation because the onions are selected of fairly uniform size before being mounted on the impaling pins at the feed end of the machine, and the objective of orientation for subsequent slicing perpendicular to the onion axis is attained even if the "halving" is not exact, geometrically.

The half onions on the impaling pins are removed at the end of the conveyor by a stripper 133 for each row, these impaled halves and the cut-off top halves 135 falling onto another chute or conveyor (not shown) and subsequently passing through horizontal slicing means.

While the operation of our machine has been described in relation to handling onions which have already been flame treated to remove dried skin, scales and rootlets, our machine may also be used on sized field dried onions, with the provision of suitable larger coring cutters to insure the removal of the rootlets as well as the interior core, and an increase in the number or force of the water jets used at the skinning station.

The advantages of automatically preparing and orienting the flame-treated onions for subsequently slicing will be apparent from the above description of a preferred form of the machine and its operations. Hand labor, except for impaling the onions on their root ends at the beginning of the conveyor, is eliminated, along with the objectionable effects on personnel of contact with onion juice. The stated objectives have been attained.

We claim:

1. A machine for preparing and orienting onions for subsequent slicing perpendicularly to the onion axis comprising in combination a stationary frame; a horizontal continuously moving translatory conveyor means mounted on said frame, said conveyor means having spaced apart link chains with flights extending therebetween, said flights being provided with holes and impaling pins on the margins of said holes; means for root coring orientated onions held on said impaling pins comprising an independently reciprocative carriage carrying a plurality of individual coring means, the forward movement of said carriage being synchronized with the horizontal movement of said conveyor; means mounted on said frame over said conveyor flights for cutting the tops off impaled cored onions mounted on said impaling pins; means mounted on said frame for fluid impingement on said cored and topped onions mounted on said impaling pins for removing the loose leaves thereof; means mounted on said frame and disposed over said conveyor flights for cutting off the upper half of said orientated cored, topped, and skinned onions on said impaling pins; and stripper means disposed adjacent the end run of said conveyor for removing the impaled half onions from said impaling pins.

2. A machine for preparing and orienting onions for subsequent slicing comprising in combination a stationary frame; a horizontal continuously movable translatory conveyor means mounted on said frame, said conveyor means having spaced apart link chains with flights extending therebetween, said flights being provided with holes and impaling pins on the margins of said holes; gang reciprocative coring means mounted on said stationary frame and disposed below said flights, and operating through the holes therein for root coring vertically orientated onions held on said impaling pins; means mounted on said stationary frame for cutting the tops off said impaled cored onions on a flight, including for each onion position a horizontal rotary saw blade on an individual motor, parallel lever means supporting each motor and saw over said conveyor flight and feeler means associated with said lever means for pre-gauging the elevation of cut of each of said rotary saw blades by contacting the top of an oncoming similarly positioned onion on said conveyor flight; and scaling means mounted on said stationary frame extending over said conveyor and disposed after said topping means, said scaling means comprising a plurality of jets for water under pressure directed onto the cut-off onion tops; said conveyor means maintaining each of the impaled onions after coring, topping and skinning whereby the natural axis thereof is perpendicular to the surface of said flights.

3. A machine for preparing and orienting onions for subsequent slicing comprising in combination a stationary frame; a horizontal continuously movable translatory conveyor means mounted on said frame, said conveyor means having spaced apart link chains with flights extending therebetween, said flights being provided with holes and impaling pins on the margins of said holes; independently reciprocative horizontally movable coring means mounted on said stationary frame and disposed below said flights, and operating through the holes therein for root coring onions held on said impaling pins; means mounted on said stationary frame for cutting the tops off said impaled orientated cored onions; jet means mounted on said stationary frame for scaling off the loose scales on said impaled topped orientated onions; individual means for cutting off the upper half of the impaled, cored, topped, and scaled onions on a conveyor flight comprising a diagonally positioned horizontal knife for each onion mounted at their ends on supporting legs depending from a support member mounted on said stationary frame extending across said conveyor flight at an elevation to cut the onion approximately in half; and stripper means disposed adjacent the end run of said conveyor for removing the impaled half onions from said impaling pins.

4. A machine for preparing and orienting onions for subsequent slicing comprising in combination a stationary frame; a horizontal continuously movable translatory conveyor means mounted on said frame, said conveyor means having spaced apart link chains with flights extending therebetween, said flights being provided with holes and impaling pins on the margins of said holes; means for root coring onions held on said impaling pins, said coring means comprising a reciprocative carriage mounted on said stationary frame, said carriage frame having members extending above and below said conveyor flights, said upper member supporting self-adjusting hold-down units adapted to engage the tops of orientated onions impaled on the impaling pins on said conveyor flights, and said lower member supporting motorized coring units, said coring units having coring knives at times projecting through the holes in said flights and adapted to ream out the root cores of onions impaled on said pins, means for reciprocating said carriage whereby on the forward horizontal movement said movable frame is timed to move with the conveyor, timed cam means for downwardly and then upwardly moving said hold-down units as a group, and other timed cam means for simultaneously upwardly and then downwardly moving said coring units as a group during the interval when said carriage is moving forward for a short distance in synchronism with a conveyor flight, said carriage being returned to a new rearward position after said hold-down units are released and said coring units are retracted; means mounted on said stationary frame for cutting the tops off said impaled cored onions on a flight, including for each onion position a horizontal rotary saw blade on an individual motor, with parallel lever means supporting each motor and saw over said conveyor flight and with feeler means associated with said lever means for pre-gauging the elevation of cut of each of said rotary saw blades by contacting the top of an oncoming similarly positioned onion on said conveyor flight; scaling means mounted on said stationary frame and extending over said conveyor and disposed after said topping means, said scaling means comprising a plurality of jets for water under pressure directed onto the cut-off onion tops; individual means for cutting off the upper half of the impaled, cored, topped, and scaled onions on a conveyor flight comprising a diagonally positioned horizontal knife mounted at its end on supporting legs depending from a support member extending across said conveyor flight at an elevation to cut the onion approximately in half; and stripper means disposed adjacent the end run of said conveyor for removing the impaled half onions from said impaling pins.

References Cited in the file of this patent

UNITED STATES PATENTS

| | | |
|---|---|---|
| 1,717,827 | Ayars | June 18, 1929 |
| 2,602,480 | Taylor | July 8, 1952 |
| 2,651,344 | Du Four | Sept. 8, 1953 |
| 2,685,901 | Putzer | Aug. 10, 1954 |
| 2,738,819 | De Back | Mar. 20, 1956 |
| 2,788,037 | Carter | Apr. 9, 1957 |
| 2,818,899 | De Back | Jan. 7, 1958 |
| 2,822,843 | Morici | Feb. 11, 1958 |
| 2,858,865 | Fleming et al. | Nov. 4, 1958 |
| 2,862,535 | Wilson et al. | Dec. 2, 1958 |
| 3,036,612 | Wilkerson | May 29, 1962 |
| 3,096,800 | Creed et al. | July 9, 1963 |